(12) United States Patent  
Karaje et al.

(10) Patent No.: US 11,233,850 B2  
(45) Date of Patent: Jan. 25, 2022

(54) REPLICATING DATA OVER A PUBLIC NETWORK

(71) Applicant: HEWLETT PACKARD ENTERPRISE DEVELOPMENT LP, Houston, TX (US)

(72) Inventors: Gurunatha Karaje, San Jose, CA (US); Tomasz Barszczak, San Jose, CA (US); Kevin Kauffman, Durham, NC (US); Nguyen Truong, Durham, NC (US); Cristian Medina Abkarian, Durham, NC (US); Michael E. Root, San Jose, CA (US); Liam McArdle, San Jose, CA (US); Zaid Bin Tariq, Durham, NC (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 180 days.

(21) Appl. No.: 15/954,856

(22) Filed: Apr. 17, 2018

(65) Prior Publication Data

US 2019/0320018 A1   Oct. 17, 2019

(51) Int. Cl.
 H04L 29/08   (2006.01)
 H04L 29/06   (2006.01)

(52) U.S. Cl.
 CPC ........ *H04L 67/1095* (2013.01); *H04L 63/029* (2013.01); *H04L 63/0281* (2013.01); *H04L 67/2871* (2013.01); *H04L 63/168* (2013.01)

(58) Field of Classification Search
 CPC ............. H04L 67/1095; H04L 67/1097; H04L 63/0428; H04L 63/061; H04L 9/32;
 (Continued)

(56) References Cited

U.S. PATENT DOCUMENTS 7,028,153 B1 *  4/2006  Noble ................. G06F 11/1458  
                                                711/161  
8,135,861 B1 *  3/2012  Bachu ................. H04L 67/1097  
                                                709/232

(Continued)

FOREIGN PATENT DOCUMENTS

CN    104838367 A    8/2015  
CN    107111457 A    8/2017

(Continued)

OTHER PUBLICATIONS huawei.com. "Oceanstor 2800 V3 Storage System V300r003 Security Configuration Guide 04," (Research Paper), Mar. 30, 2017, http://support.huawei.com/enterprise/documentOnline?contentId=DOC1000083999&sendFrom=mobile&currentPartNo=10062&togo=content.

(Continued)

*Primary Examiner* — Dhairya A Patel  
*Assistant Examiner* — Sandarva Khanal  
(74) *Attorney, Agent, or Firm* — Trop, Pruner & Hu, P.C.

(57) ABSTRACT

A technique includes causing an agent device to setup a replication partnership between a first storage node and a second storage. Causing the agent device to setup the replication partnership includes configuring a proxy server that is associated with the second storage node to establish a secure communication channel for the replication partnership over a public network. Configuring the proxy server includes storing in the proxy server credentials for authenticating the first storage node to use the secure communication channel; and establishing port translations to be used in the secure communication channel in communicating replication data between the first storage node and the second storage node. Causing the agent device to setup the (Continued)

replication partnership may also include communicating replication partnership information to the second node.

18 Claims, 8 Drawing Sheets

(58) Field of Classification Search
CPC ........... H04L 2209/605; H04L 41/0213; H04L 41/0668; H04L 41/28; H04L 63/0281; H04L 63/029; H04L 63/0485; H04L 63/06; H04L 63/062; H04L 63/08; H04L 63/083; H04L 63/0838; H04L 63/0846; H04L 63/1416; H04L 63/168; H04L 67/025; H04L 67/10; H04L 67/2871; H04L 9/0861; H04L 9/088; H04L 9/14; H04L 9/16; H04L 9/30; H04L 9/3263; G06F 11/0727; G06F 11/0748; G06F 11/0766; G06F 11/1446; G06F 11/1451; G06F 11/1456; G06F 11/1464; G06F 11/1469; G06F 11/1471; G06F 11/1612; G06F 11/2033; G06F 11/2053; G06F 11/2056; G06F 11/2094; G06F 11/3006; G06F 11/3034; G06F 11/3065; G06F 11/327; G06F 16/275; G06F 21/305; G06F 21/31; G06F 21/46; G06F 21/60; G06F 21/6245; G06F 21/73; G06F 21/85; G06F 2201/805; G06F 2201/82; G06F 2213/3808; G06F 3/0619; G06F 3/065; G06F 3/0653; G06F 3/067
See application file for complete search history.

(56) References Cited

U.S. PATENT DOCUMENTS

| | | | |
|---|---|---|---|
| 9,009,525 | B1 | 4/2015 | Murphy et al. |
| 9,152,578 | B1 | 10/2015 | Saad et al. |
| 9,378,262 | B2 | 6/2016 | Braddy |
| 9,507,678 | B2 | 11/2016 | Panara et al. |
| 9,516,016 | B2 | 12/2016 | Colgrove et al. |
| 9,594,636 | B2 | 3/2017 | Mortensen et al. |
| 9,602,344 | B1 | 3/2017 | Iyengar et al. |
| 9,661,007 | B2 | 5/2017 | Gasparakis et al. |
| 9,697,082 | B2 | 7/2017 | Nakajima et al. |
| 9,740,880 | B1 | 8/2017 | Natanzan et al. |
| 9,917,896 | B2 | 3/2018 | Powell et al. |
| 10,019,194 | B1 | 7/2018 | Baruch et al. |
| 10,235,392 | B1* | 3/2019 | Jauhal .................. G06F 16/21 |
| 2003/0043740 | A1* | 3/2003 | March ................. H04L 61/2517 370/229 |
| 2003/0088768 | A1 | 5/2003 | Challener |
| 2003/0154306 | A1* | 8/2003 | Perry ................ H04L 29/12009 709/245 |
| 2003/0210691 | A1 | 11/2003 | Chen et al. |
| 2005/0081119 | A1 | 4/2005 | DiZoglio et al. |
| 2005/0144474 | A1* | 6/2005 | Takala ................. H04L 63/083 726/27 |
| 2006/0182050 | A1* | 8/2006 | Dohm ................. G06F 11/2056 370/312 |
| 2007/0153782 | A1* | 7/2007 | Fletcher ................ H04J 3/1617 370/389 |
| 2008/0086609 | A1* | 4/2008 | Lesser ................. G06F 11/1458 711/162 |
| 2009/0100109 | A1 | 4/2009 | Turski et al. |
| 2009/0177856 | A1* | 7/2009 | Herne .................. G06F 11/1464 711/162 |
| 2009/0210461 | A1 | 8/2009 | McChord |
| 2011/0055899 | A1 | 3/2011 | Dollar |
| 2012/0123920 | A1* | 5/2012 | Fraser ..................... G06F 21/36 705/34 |
| 2013/0219469 | A1* | 8/2013 | Peterson ............... H04L 63/101 726/4 |
| 2013/0291064 | A1* | 10/2013 | Ayvaz ..................... G06F 21/00 726/4 |
| 2015/0020186 | A1* | 1/2015 | Deutsch ............. H04L 61/2528 726/11 |
| 2015/0046600 | A1* | 2/2015 | Kim .................... H04L 67/1095 709/232 |
| 2015/0295890 | A1 | 10/2015 | Qin et al. |
| 2015/0347548 | A1* | 12/2015 | Mortensen .............. G06F 16/27 707/618 |
| 2016/0266801 | A1* | 9/2016 | Marcelin Jemenez ....................... G06F 3/0619 |
| 2016/0342532 | A1* | 11/2016 | Peacock ................ H04L 9/0822 |
| 2017/0060695 | A1* | 3/2017 | Clare ................... G06F 11/1451 |
| 2017/0316075 | A1* | 11/2017 | Deshmukh ............ G06F 21/604 |
| 2018/0077121 | A1 | 3/2018 | Gordon et al. |
| 2018/0107727 | A1 | 4/2018 | Deshmukh et al. |

FOREIGN PATENT DOCUMENTS

| | | |
|---|---|---|
| CN | 108604164 A | 9/2018 |
| EP | 2878102 A1 | 6/2015 |
| JP | 2003-264541 A | 9/2003 |
| WO | WO-2013020178 A1 | 2/2013 |
| WO | 2014/016571 A1 | 1/2014 |
| WO | 2014/166571 A1 | 10/2014 |
| WO | 2017/190129 A1 | 11/2017 |

OTHER PUBLICATIONS

Allcock et al., "Secure, Efficient Data Transport and Replica Management for High-performance Data-intensive Computing," Apr. 2001, pp. 13-27.
Glenn Fleishman, "The Best Online Backup Service for Securely Encrypting Your Data", available online at <https://www.infoworld.com/article/3124144/cloud-computing/the-best-online-backup-service-for-securely-encrypting-your-data.html>, Sep. 26, 2016, 10 pages.
Masha, T. et al., "Replication Security Best Practices," available online at <https://docs.microsoft.com/en-us/sql/relational-databases/replication/security/replication-security-best-practices?view-sql-server-2017=&view=sql-server-ver15>, Microsoft, Mar. 14, 2017, 3 pages.
Masha, T et al., "Securing Replication over the Internet", available online at <https://docs.microsoft.com/en-us/sql/relational-databases/replication/security/securing-replication-over-the-internet?view-sql-server-2017>, Microsoft, Mar. 14, 2017, 2 pages.
Wikipedia, "Transport Layer Security", available online at <https://en.wikipedia.org/w/index.php?title=Transport_Layer_Security&oldid=833407629>, Mar. 31, 2018, 37 pages.
Wikipedia, "HTTPS", available online at <https://en.wikipedia.org/w/index.php?title=HTTPS&oldid=833172891>, Mar. 30, 2018, 10 pages.
Wikipedia, "Secure Shell," available online at <https://en.wikipedia.org/w/index.php?title=Secure_Shell&oldid=833485297>, Mar. 31, 2018, 12 pages.
VMWare Inc., "VMWare vSphere Replication Administration: vSphere Replication 6.0," 2017, pp. 1-128.

* cited by examiner

REPLICATING DATA OVER A PUBLIC NETWORK

BACKGROUND

A computer network may have a backup and recovery system for purposes of restoring data on the network to a prior, consistent state should the data become corrupted, be overwritten, subject to a viral attack, etc. The backup data may be stored at a different geographic location than the source data. For example, backup data for a given group of storage nodes of a computer network may be stored in a geographically remote, cloud-based group, or pod, of storage nodes.

DETAILED DESCRIPTION

Figure 1:
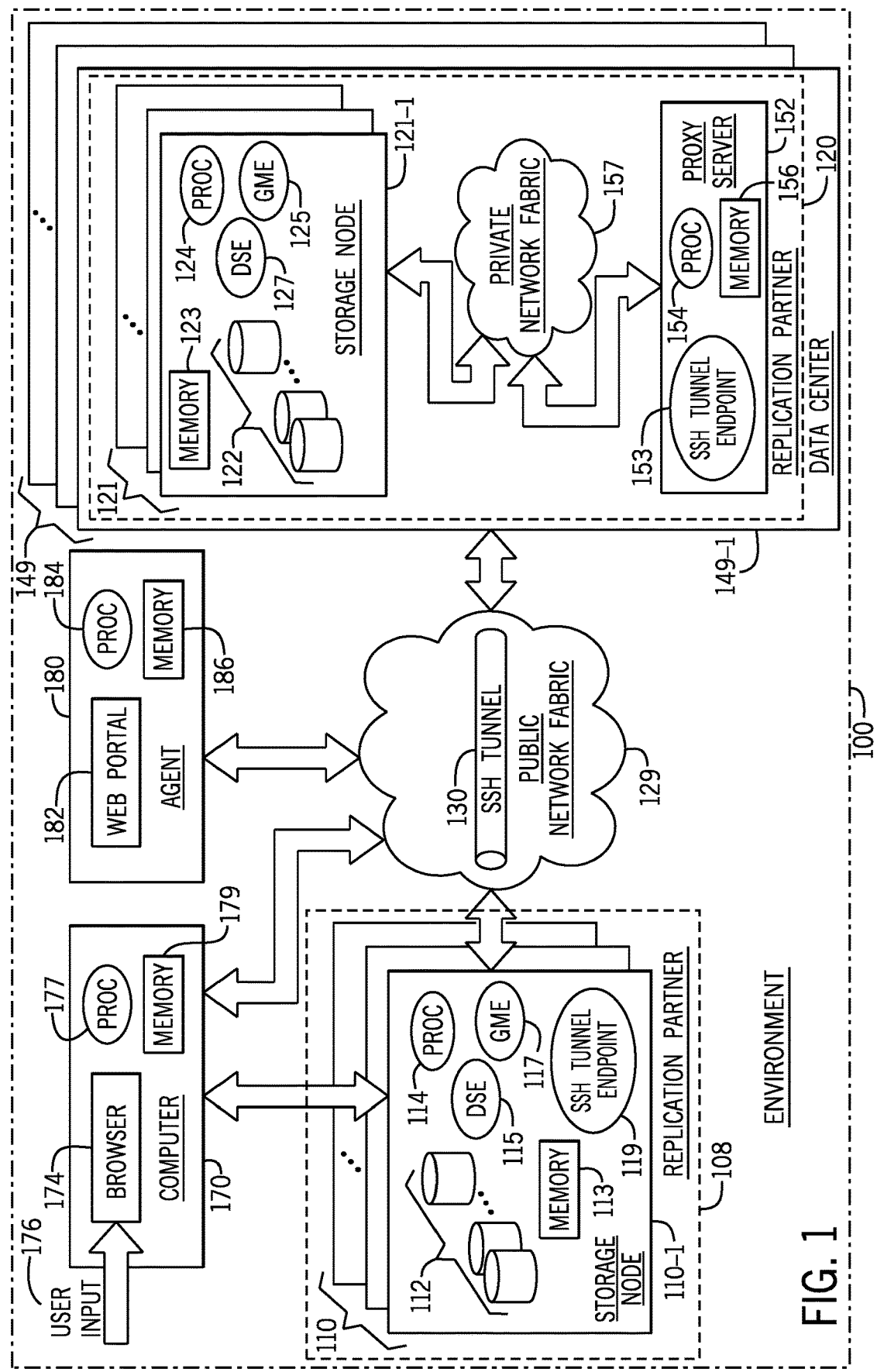
FIG. 1 is a schematic diagram of an environment associated with a replication partnership according to an example implementation.

A group of one or multiple storage nodes of a computer network may be configured to be a replication partner with a geographically remote group of one of multiple storage nodes. Due to this partnership, replication data may be communicated between the replication partners so that, in general, each replication partner stores the same data. As an example, a group of storage nodes of a computer network may have a replication partnership with a group, or pod, of cloud-based storage nodes. In this manner, the group of storage nodes of the computer network may be a local replication partner, and as data changes on the local replication partner, the local replication partner may communicate replication data to the cloud-based storage nodes, which is the remote replication partner. In general, the replication data represents changes in the data stored on the local replication partner, so that the data stored on the remote replication partner may be used to restore the data on the local replication partner to a prior, consistent state.

In this context, a "storage node" refers to an independent unit of storage, which contains one or multiple storage devices (flash memory drive devices, magnetic media drive devices, and so forth) and is capable of communicating data with another storage node. As a more specific example, a given storage node may be an independent computer system containing one or multiple storage devices, a storage area network (SAN), and so forth. Moreover, a given storage node may employ block-based or file-based storage.

Because the replication partners may be disposed at different geographical locations, the replication data may be communicated between the replication partners over a secure communication channel of a public network. In this context, a "secure communication channel" refers to a logical connection that employs some degree of security features for purposes of preventing unauthorized access to or the reading of the data communicated between the replication partners. As an example, the secure communication channel may involve the encryption of plaintext data to form ciphertext data that is communicated to the communication channel and the decryption of ciphertext data that is received from the communication channel. The secure communication channel may be established, for example, by a secure channel communication protocol, such as a Secure SHell (SSH) protocol, which establishes a secure communication channel called an "SSH tunnel," or "SSH connection" herein. Thus, when two arrays are geographically apart, replication happens over a public network, and the replication has security for data exchange for purposes of preventing malicious attempts at reading the data. Because setting up replication over a public network may involve opening up network ports in the infrastructure or poking a hole in the private network, securing the network infrastructure at two endpoints of replication may be beneficial.

One way to securely communicate replication data over a public network is to delegate the security of the replication data transfer and the security of the network infrastructure to specific network devices, such as firewall or virtual private network (VPN) devices. These network devices may not, however, be part of either storage array system. If potential replication partners are not owned by the same entity and will involve communicating the replication data over a public network, it may be challenging to set up such network devices with the appropriate keys, credentials, and so forth.

In accordance with example implementations that are described herein, a web portal and a proxy server (e.g., an "SSH proxy" in accordance with example implementations) are used to setup and manage a replication partnership between a first replication partner (called a "local replication partner" herein) and a geographically remote second replication partner (called a "remote replication partner" herein) over a public network. As an example, the local replication partner may contain one or multiple storage nodes, such as storage node(s) of a computer network; and a backup and recovery solution for the computer network may include forming a replication partnership between these storage node(s) of the computer network and a group, or pod, of one or multiple cloud-based storage node(s) (i.e., the remote replication partner).

In general, a user associated with a computer network may access the web portal through a browser (an application that allows accessing information from the Internet) that executes on the user's computer. The web portal may be provided by an agent (a cloud-based server, for example), for the local replication partner. In general, the agent orchestrates setting up the replication partnership and the agent/web portal may be owned by a different entity than the entity that owns the computer network. The user may provide input (via keystrokes, mouse clicks, touch screen gestures, and so forth) to the web portal for purposes of requesting a new replication partnership. In this manner, the input provided to the web portal may describe the overall setup for the replication partnership. In this manner, the "overall setup" for the replication partnership includes generally setting up criteria for the replication partnership, including setting up an identifier used in the future to identify the replication partnership, identifying the one or more storage nodes to form the "local partner" of the replication partnership, the identifier(s) of the local storage nodes of the local replication partner, keys used by the local replication partner, and so forth. Moreover, the user may provide input to the web portal to identify (storage tier, storage size, geographical area, and so forth) for selecting the storage node(s) that will form the remote replication partner. Moreover, in accordance with example implementations, the user may provide input to the web portal, which identifies one or multiple storage nodes of the computer network that are to form the local replication partner; and the browser (via execution of a script, for example) retrieves information, such as SSH keys and storage node identifications (IDs), for example, from the storage node(s) of the local replication partner and sends this information to the web portal. The web portal may then use the information to configure the replication partnership, as further described herein.

In general, an "SSH key" refers to a key that is used to identify a network entity to an SSH server using public key cryptography and challenge-response authentication, pursuant to the SSH protocol.

In accordance with example implementations, based on the criteria provided by the user, the agent selects the storage node(s) that form the remote replication partner. In accordance with example implementations, selection involves selecting a particular data center associated with the user's selected geographical area and selecting a group of one or multiple storage nodes of the selected datacenter.

In accordance with example implementations, the remote replication partner is associated with a proxy server (a proxy server of the selected data center, for example). The proxy server serves as a network endpoint for replication partnerships involving storage nodes of the data center. It is noted that the datacenter may include multiple such proxy servers.

In general, the agent communicates with the proxy server to configure the remote replication partner for the replication partnership and configure the proxy server for the secure communication channel to be used to communicate the replication data for the replication partnership. In accordance with some implementations, the agent may communicate with the proxy server by issuing commands to the proxy server via a remote shell (RSH). In accordance with further example implementations, the agent may communicate with the proxy server using REpresentational State Transfer (REST) application programming interface (API) calls, which result in HyperText Transfer Protocol (HTTP) requests.

In accordance with example implementations, the agent communicates with the proxy server to store credentials of the local replication partner in the proxy server so that when the local replication partner initiates the secure communication channel with the proxy server, the proxy server can authenticate the local replication partner. Moreover, the agent communicates with the proxy server to set up port translations (or "mappings") that are used in connection with the secure communication channel. In this context, the port translations refer to port forwarding performed by both network endpoints of the secure communication channel, as further described herein.

In accordance with example implementations, after the agent communicates with the proxy server (of the remote replication partner) to set up the replication partnership and set up the associated secure communication channel, the agent may then communicate data to the local replication partner pertaining to details about the replication partnership and secure communication channel. In this manner, the agent may communicate replication partnership login identification for the local replication partner, port forwarding details, and so forth. The local replication partner may thereafter initiate communication with the proxy server (e.g., an SSH proxy, in accordance with example implementations) for purposes of creating the secure communication channel (e.g., an SSH connection, or SSH tunnel); and after the secure communication channel is created, the local replication partner may communicate with remote replication partner for purposes of transferring replication data over the secure communication channel.

Due to the techniques and systems that are described herein, information may be readily, easily and securely exchanged between storage nodes for purposes of setting up a replication partnership between the nodes, even when the storage nodes are owned by different entities. Moreover, the storage nodes do not need associated special devices, such as virtual private network (VPN) devices, firewalls, and so forth.

FIG. 1 depicts an example environment 100 for setting up a replication partnership according to an example implementation. The replication partnership to be set up for this example includes a first replication partner 108 (also called the "local replication partner" herein) and a second replication partner 120 (also called the "remote replication partner" herein). The local replication partner 108 includes one or multiple storage nodes 110, and the remote replication partner 120 includes one or multiple storage nodes 121. As an example, a storage node 110 or 121 may be a storage array (an array in a storage area network (SAN), for example).

As a more specific example, the storage node(s) 110 may be at a different geographical location than the storage node(s) 121. In accordance with some implementations, the storage node(s) 121 may be part of a data center 149, and the data center 149 may be one of multiple data centers 149 that provide cloud-based data storage and are located at different geographical locations. For example, in this manner, for the United States, one or multiple data centers 149 may be associated with an East coast location, one or multiple data centers 149 may be associated with a West coast location, and so forth.

It is noted that FIG. 1 depicts an example group, or pod, of storage nodes 121 of the particular data center 149-1. The data center 149-1 may contain additional storage nodes, which may be associated with different storage pods and/or different replication partnerships. The storage nodes 121 that are depicted in FIG. 1 may be associated with more than one replication partnership. Moreover, a computer network containing the storage nodes 110 for the local replication partner 110 have additional storage nodes that are not associated with the replication partnership described herein, and the storage nodes 110 depicted in FIG. 1 may be associated with other replication partnerships.

As also depicted in FIG. 1, for the replication partnership described herein, a secure communication channel, such as an SSH tunnel 130, is to be used to communicate the replication data between the replication partners 108 and 120. In general, replication data may be communicated between the replication partners 108 and 120 in either direction across the SSH tunnel 130.

In general, the storage nodes 110 may, in accordance with example implementations, be associated with a private network (not illustrated). In this manner, in general, the storage nodes 110 may not have addresses that are accessible via public Internet Protocol (IP) addresses.

As a more specific example, in accordance with some implementations, the computer 170 may execute machine executable instructions to provide an Internet browser 174. Using the browser 174, the user may, via public network fabric 129, access a web portal 182, which is an Internet-based interface that is provided by an agent 180 (an Internet server, for example). The connection to the web portal 182 may be through a Hypertext Transport Protocol Secure (HTTPS) session, for example. After providing the appropriate login credentials, the user may access a page of the web portal 182 for purposes of creating, or setting up, the remote replication partner. Using the access to the web portal 182, the user may enter a name for the remote replication partner to be created, data (through dialog boxes, for example) to select a particular geographic region (e.g., East Coast, Midwest, Southwest, West Coast and so forth) for the remote replication partner and other criteria to be considered for purposes of selecting the remote replication partner, such as the storage tier, and the amount, or capacity, of data storage. Based on these parameters, the agent 180 may select a particular data center 149 (data center 149-1 for the example depicted in FIG. 1) and a group of one or multiple storage nodes 121 of the selected data center 149.

In accordance with example implementations, a user (a network administrator, for example) who is affiliated with the computer network containing the storage nodes 110 may initiate the creation of a replication partnership with the nodes 110. In this manner, in accordance with example implementations, the user may provide user input 176 (input derived from keystrokes, mouse interaction with a graphical user interface (GUI), touch gestures and so forth) with a computer 170 for purposes of setting up the replication partnership, identifying the storage nodes 110 that form the local replication partner 108 and identifying criteria for the remote replication partner 120, such as the name of the remote replication partner 120. The setting up of the replication partnership may, for example, involve the user using the computer 170 to access the storage nodes 110 for purposes of retrieving data from the storage nodes 110 pertaining to credentials and identifications of the storage nodes 110.

In this manner, the user may, through a dialog box, enter a name of the remote replication partner. The browser 174 may then execute a script to cause the browser 174 to, through an HTTPS session with the storage node(s) 110, retrieve credentials (SSH keys, for example) from the storage nodes 110. In accordance with some implementations, access of the computer 170 to the storage nodes 110 may be through the use of private network fabric (not illustrated). The browser 174 then may communicate with agent 180 via HTTPS session, providing details and credentials of storage node(s) 110 and request to create a replication partnership between local storage node(s) 110 and storage node(s) 121 that are selected to form the remote replication partner 120.

The agent 180 may then communicate with a proxy server 152 for the data center 149-1 via the public network fabric 129. In this manner, as further described herein, the agent 180 may communicate with the proxy server 152 for purposes of transferring credentials for the storage nodes 110 to the proxy server 152 and configuring port forwarding that is used with the SSH tunnel 130. The agent 180, may then communicate replication partnership details and SSH tunnel credentials (an SSH key and an SSH user name, for example) to the browser 174, which may then communicate this information to the local replication partner 108 and cause the local replication partner 108 to initiate the SSH connection with the proxy server 152.

In accordance with some implementations, one of the storage nodes 110 of the local replication partner 108, such as storage node 110-1, is a manager for the group of storage nodes 110 (i.e., initiates and drives the replication for the group of storage nodes 110-1) and serves as an SSH tunnel endpoint 119 for the local replication partner 108. On the other end of the SSH tunnel 130, the proxy server 152 serves as an SSH tunnel endpoint 153 for the remote replication partner 120; and one of the storage nodes 121, such as storage node 121-1, is the manager for the group of storage nodes 121 of the remote replication partner 120.

As depicted in FIG. 1, the proxy server 152 may communicate with the storage nodes 121 via private network fabric 157. In accordance with example implementations, due to local and remote port forwarding associated with communications over the SSH tunnel 130 (as described herein), the storage nodes 110 may open a single SSH port for the SSH tunnel 130, and likewise, the proxy server 152 may open a single SSH port.

As noted above, in accordance with example implementations, the browser 174 may perform the functions described herein through the execution of a program, or script. In this regard, the browser 174 as well as the program executed by the browser 174 may be formed through machine executable instructions (i.e., "software") that are stored in a memory 179 of the computer 170 and are executed by one or multiple hardware processors 177. In general, the memory 179 may be formed from a non-transitory storage medium, such as a storage medium formed from one or multiple semiconductor storage devices, magnetic storage devices, memristors, phase change memory devices, flash memory devices, volatile memory devices, non-volatile memory devices, a combination of storage devices formed from one or more of the foregoing or other storage devices, and so forth. The processor(s) 177 may be, as examples, one or multiple Central Processing Units (CPUs), one or multiple CPU processing cores, and so forth.

The agent 180 may contain one or multiple hardware processors 184 and a memory 186 that stores instructions that, when executed by one or more of the processors 184, cause the processor(s) 184 to perform one or more functions of the agent 180, which are described herein. In a similar manner, the proxy server 152 may contain one or multiple hardware processors 154 and a memory 156 that stores instructions that, when executed by the processor(s) 154, cause the processor(s) 154 to perform one or more of the functions of the proxy server 152 which are described herein. It is noted that the memories 156 and 186 may be non-transitory memories and may contain one or more storage devices, similar to the memory 179. Moreover, the processors 154 and 184 may be processors similar to the processors 177.

In accordance with example implementations, each storage node 110 may include one or multiple storage devices 112 (e.g., hard disk drives (HDDs), magnetic storage drives, solid state drives (SSDs), flash memory drives, and so forth, or a combination thereof). Moreover, a storage node 110 may contain one or multiple processors 114 and a non-transitory memory 113 that stores instructions that, when executed by the processor 115, cause the processor 115 to perform one or more functions of the storage node 110 described herein. In particular, in accordance with some implementations, the execution of instructions by the processor(s) 114 may cause the processor(s) 115 to form background processes, or daemons, such as a group management engine 117.

The group management engine 117, in accordance with example implementations, controls the actions of the manager node 110 (such as node 110-1) for the group and more specifically controls the replication management services for the replication partner 108. In general, the group management engine 117 initiates and drives its associated replication group (i.e., the local replication partner 108) and communications with the remote replication partner 120. Each storage node 110 may also contain a data services engine 115, another daemon, in accordance with example implementations. Thus, in accordance with example implementations, if the local replication partner 108 has N storage nodes 110, then there are N instances of the data services engine 115 and one instance of the data management engine 117. In general, the data services engine 115 is responsible for data movement between the two partnership groups for purposes of transferring replication data between the groups. The data services engines 115 of the local replication partner 108 communicate data with corresponding data services engines 127 of the storage nodes 121 of the remote replication partner 120. Similar to the storage nodes 110, in accordance with example implementations, a single storage node 121 may contain a single group management engine 125 for purposes of providing replication management services for the particular replication group, and each storage node 121 of the replication group may contain a data services engine 127. Similar to the data services engine 115 and the general management engine 117, the data services engine 127 and the general management engine 125 may be background processes, or daemons, formed by the execution of machine executable instructions that are stored in a non-transitory memory 123 and executed by one or multiple hardware processors 124. Each storage node 121 may include one or multiple storage devices 122 (e.g., hard disk drives (HDDs), magnetic storage drives, solid state drives (SSDs), flash memory drives, and so forth, or a combination thereof).

In accordance with example implementations, the public network fabric 129 and the private network fabric 127 may include any type of wired or wireless communication network, including cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), telephony networks, local area networks (LANs) or wide area networks (WANs), or any combination thereof. The public network fabric 129 may include any of the foregoing networks, as well as global networks (e.g., network fabric communicating Internet traffic) or any combination thereof.

Figure 2:
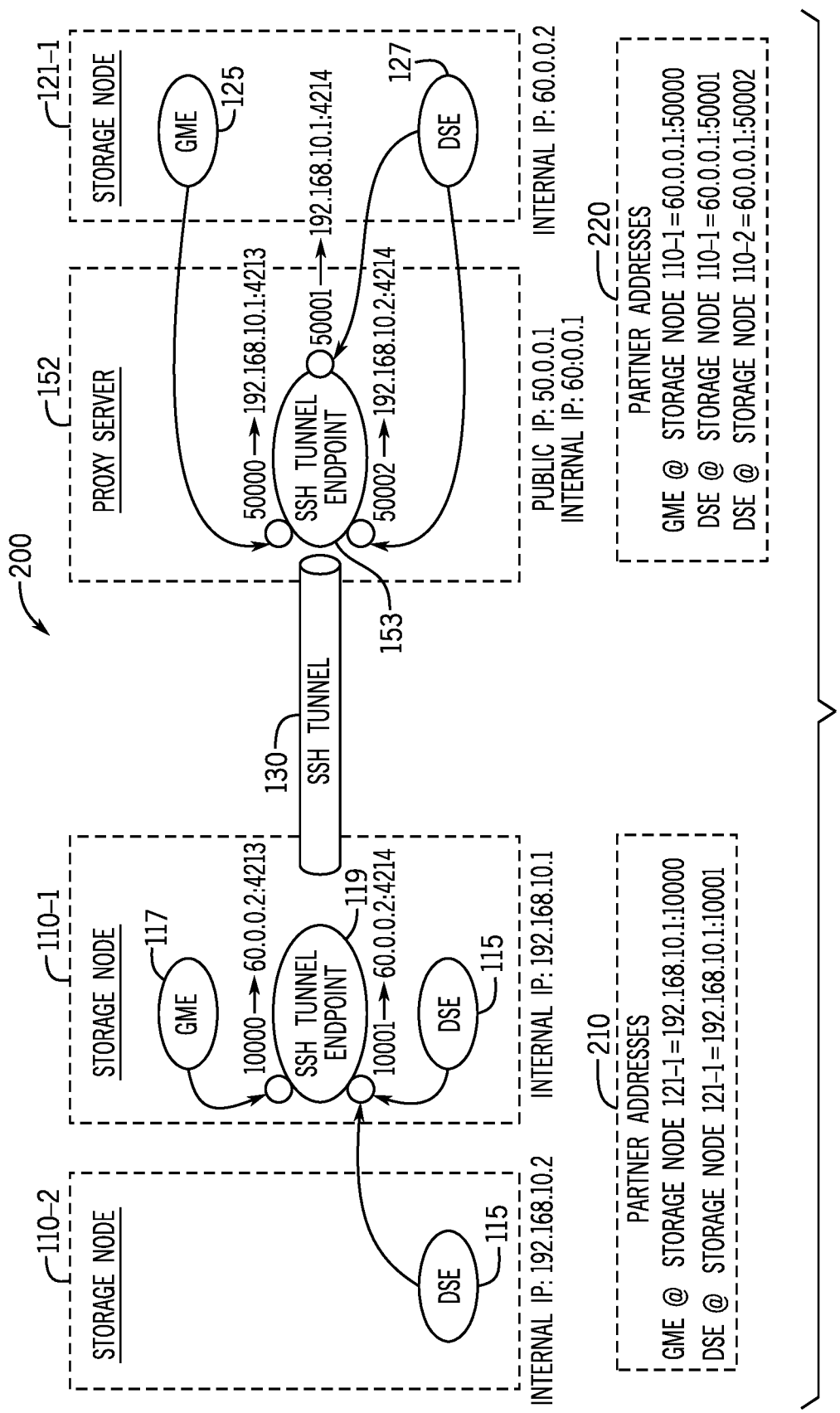
FIG. 2 is an illustration of local and remote port forwarding according to an example implementation.

FIG. 2 is an illustration 200 of local and remote port forwarding used in connection with the SSH tunnel 130 in accordance with example implementations. In particular, for this example, the storage node 110-1, the manager node for the local replication partner 108, has a private, internal Internet Protocol (IP) address of 192.168.10.1, and other storage nodes 110 (such as storage node 110-2) have other corresponding private, internal IP addresses, such as address 192.168.10.2 for the storage node 110-2. For the remote replication partner 120, the proxy server 152 has a public IP address 50.0.0.1 and a corresponding private, internal IP address 60.0.0.1. Moreover, similar to the storage nodes 110, the storage nodes 121 have corresponding private, internal IP addresses, such as internal IP address 60.0.0.2 for the storage node 121-1 which is the manager node for the remote replication partner 120. In a similar manner, other storage nodes 121 may have other corresponding private, internal IP addresses.

For purposes of the group management engines 117 and 125 communicating with each other, the SSH tunnel endpoint 153 provided by the proxy server 152 and a corresponding SSH tunnel endpoint 119 provided by the storage node 110-1 perform port translations. In this manner, in accordance with some implementations, when the agent 180 configures the proxy server 152 with the port translations, the agent 180 may request port translations similar to the following example:

ssh<user>@50.0.0.1-L 10000:60.0.0.2:4213-L 10001: 60.0.0.2:4214-R 50000:192.168.10.1:4213-R 50001: 192.168.1:4214-R 50002:192.168.10.2:4214

The above example sets forth local port forwarding and reverse, or remote, port forwarding translations for the public IP address 50.0.0.1 of the proxy server 152. The delimiter "-L" signifies a local port forwarding translation immediately preceding the "-L" delimiter; and the "-R" delimiter signifies a remote port forwarding translation immediately following the delimiter. For example, the first local port forwarding translation "10000:60.0.0.2:4213" represents that an incoming communication from the SSH tunnel 130 (to the remote replication partner 120) directed to port 10000 is to be redirected by the proxy server 152 to port 4213 at internal IP address 60.0.0.2 (i.e., the address/port of the general management engine 125 of the storage node 121-1). In words, the general management engine 117 sends communications to the general management engine 125 to port 10000, and the SSH tunnel endpoint 153 directs these communications to the private IP address/port of the general management engine 125.

As another example, the local port forwarding translation "10001:60.0.0.2:4214" in the example expression above represents another local port translation for the SSH tunnel endpoint 153 in which the endpoint 153 redirects traffic directed to port 10001 to be internal IP address 60.0.0.2: 4214, which is the address/port of the data services engine 127 of the storage node 121-1. In words, a data services engine 115 of the local replication partner 108 may send data to a data services engine 127 of the storage node 121-1 using port 10001, and the SSH tunnel endpoint 153 directs this data to the appropriate private IP address/port of the storage node 121-1 assigned to the data services engine 127.

The example expression above also sets forth remote port forwarding translations, which are handled by the SSH tunnel endpoint 119 of the storage node 110-1. In this manner, in accordance with example implementations, the proxy server 152 is configured with the remote port forwarding; and when the storage node 110-1 initiates the SSH connection, the proxy server 152 sets up the SSH tunnel endpoint 119 for the remote port forwarding. As an example, the remote port forwarding "50000:192.168.10.1:4213" represents that the SSH tunnel endpoint 119 translates incoming traffic from the SSH tunnel 130 to internal IP address 192.168.10.1:4213, which is the address/port of the general management engine 117. Likewise, the remote port forwarding set forth above sets forth remote port forwarding for the data services engine 115 of the storage node 110-2 and the data services engine 115 of the storage node 110-1.

Thus, as depicted at reference numeral 210 of FIG. 2, the general management engine 117 of the storage node 110-1 may access the general management engine 121-1 using partner address 192.168.10.1:10000, and the data service engines 115 of the storage nodes 110 may access the data services engines 127 of the storage nodes 121 using partner address 192.168.10.1:10001. On the other end of the SSH tunnel 130, the general management engine 125 of the storage node 121-1 may access the general management engine 117 of the storage node 110-1 using the address 60.0.0.1:50000; the data services engine 127 of the storage node 121-1 may communicate with the data services engine 115 of the storage node 110-1 using the partner address 60.0.0.1:50001; and the data services engine 127 may communicate with the data services engine 115 of the storage node 110-2 using the partner address 60.0.0.1:50002.

Figure 3A:
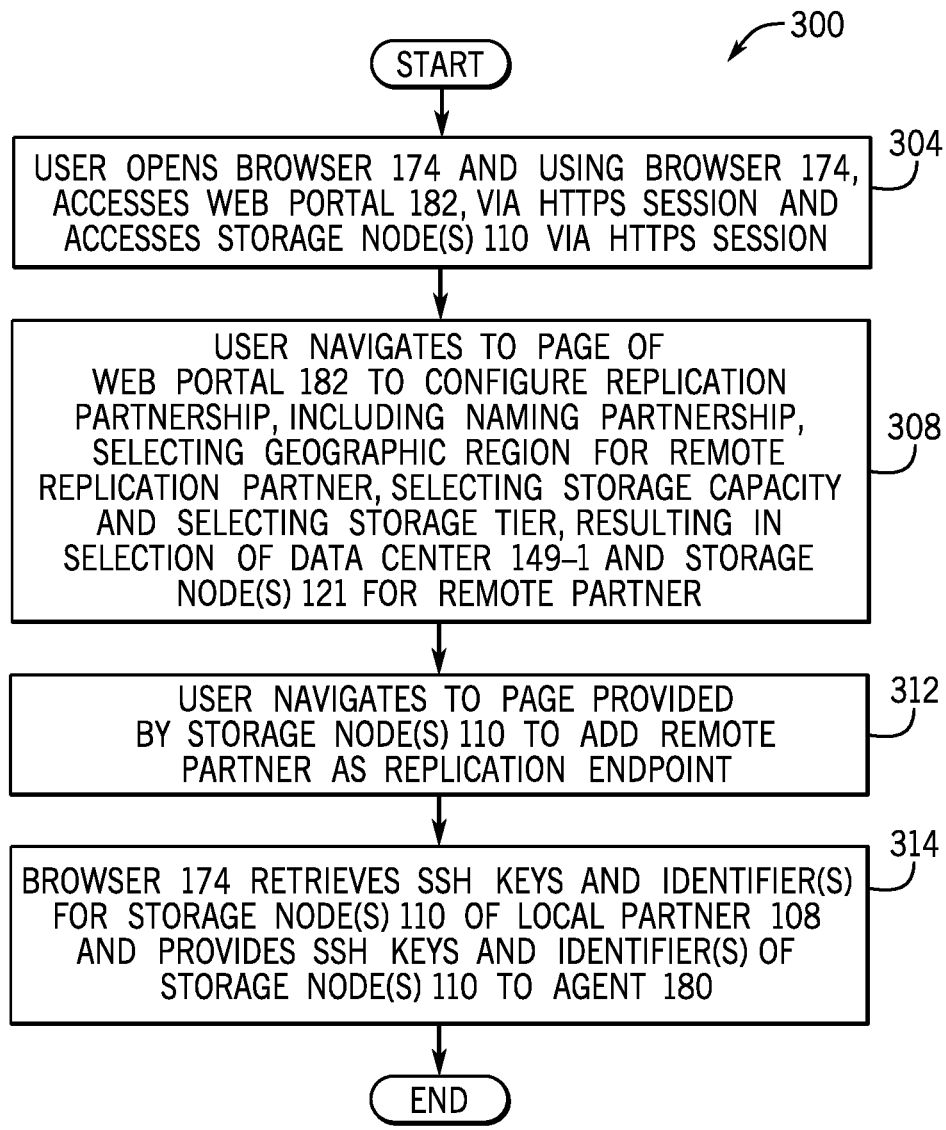
FIG. 3A depicts a flow diagram of a technique performed by a user via a browser to set up a replication partnership in which replication data is communicated over a public network according to an example implementation.
Figure 3B:
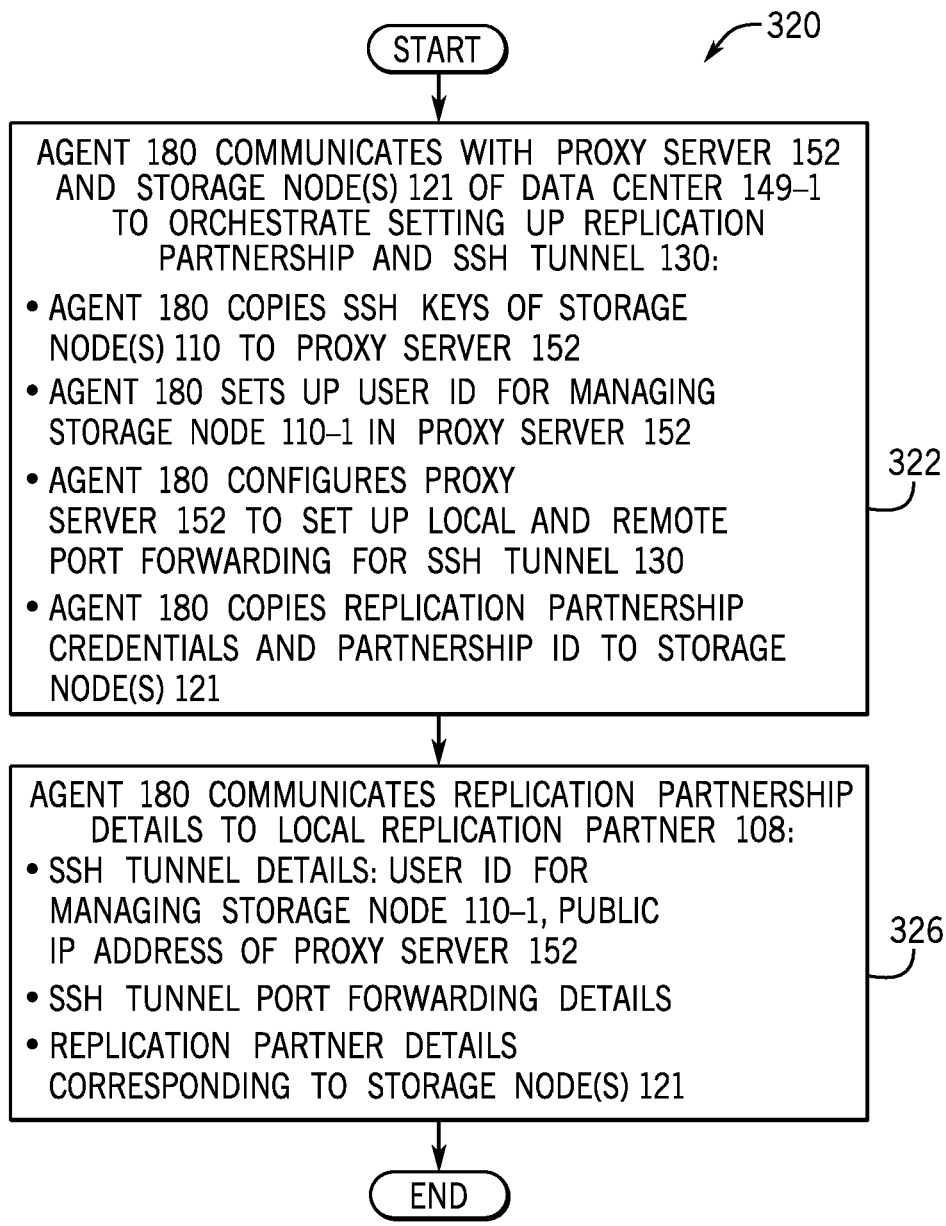
FIG. 3B depicts a flow diagram of a technique performed by an agent to set up the replication partnership according to an example implementation.
Figure 3C:
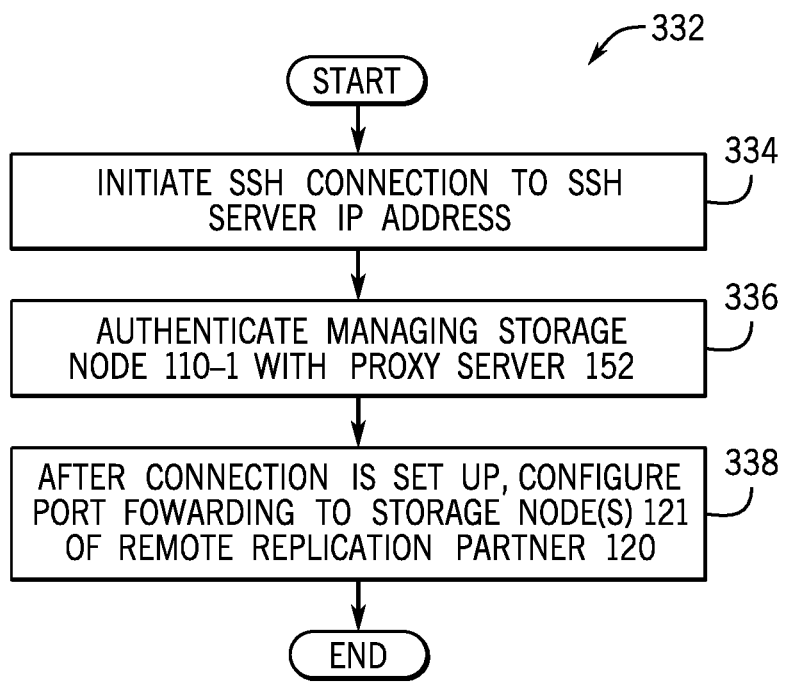
FIG. 3C depicts a flow diagram of a technique performed by a proxy server to initiate the replication partnership according to an example implementation.

FIGS. 3A, 3B and 3C depict example techniques 300, 320, and 332, respectively, which may be used, in accordance with some implementations, to setup and initiate a replication partnership and associated secure communication channel. The example technique 300 may be performed, for example, by a user via a browser, such as the browser 174 described above. The example technique 320 may be performed, for example, by an agent, such as the agent 180 described above, in response to messages received from the browser. The example technique 332 may be performed, for example, by a managing node of a local replication partner, such as the managing node 110-1 described above, in response to messages received from the agent 180.

Referring to FIG. 3A in conjunction with FIG. 1, the technique 300 includes, pursuant to block 304, the user opening the browser 174 and using the browser 174 to access the web portal 184 via an HTTPS session and access the storage node(s) 110 (i.e., the nodes for the local replication partner) via an HTTPS session.

Pursuant to block 308, the user may then navigate to a page of the web portal 182 to configure the replication partnership, including naming the partnership, selecting a geographic region for the replication partner, selecting a capacity for the replication partner and selecting a storage tier. The user may navigate, as depicted in block 312, to a page provided by the storage node(s) 110 (a page provided by the managing storage node 110, for ex example) to provide input to add the remote replication partner as the replication endpoint.

Pursuant to block 314, the technique 300 includes the user retrieving, via the browser 174, the SSH keys and identifiers of the storage node(s) 110 of the local replication partner 110 and providing, via the browser 174, the SSH keys and identifiers to the agent 180.

Referring to FIG. 3B and the technique 320 in conjunction with FIG. 1, pursuant to block 322, the agent 180 may, in response to receiving configuration information from a user, select a particular data center 149 and group of one or multiple storage nodes 121 to form a replication partner 120. Pursuant to block 326, the agent 180 may communicate with the proxy server 152 and the selected storage node(s) 121 of the selected datacenter 149 to orchestrate the setting up of the replication partnership 120 and the SSH tunnel 130. For example, this orchestration may include the agent 180 copying the SSH keys of the storage nodes 110 to the proxy server 152; and setting up a user ID for the managing storage node 110-1 in the proxy server 152. Here, the user ID may be an ID that is used for purposes of authenticating with the proxy server 152 and setting up the SSH tunnel 130. The orchestration may further include configuring the proxy server 152 to set up local and remote port forwarding for the SSH tunnel 130; and copying replication partnership credentials to the storage node(s) 121 of the remote replication partner 120. In accordance with example implementations, the replication partnership credentials are different from the SSH tunnel credentials and include, for example, a shared secret and a replication partner ID of the managing storage node 110-1. In accordance with example implementations, the above-described actions may be performed by one or multiple hardware processors of the agent 180 executing machine executable instructions to make calls to a REST API (not shown) of the agent 180.

Pursuant to block 326, the agent 180 communicates replication partnership details to the local replication partner 108, where the replication partnership details include: the SSH tunnel 130 details, including the user ID for the storage node 110-1 and the public IP address of the proxy server 152; SSH tunnel 130 port forwarding details; and replication partner 120 details corresponding to the storage node(s) 121.

The technique 320 described above may be embodied (in whole or in part) in machine readable instructions that, when executed by a processor of the agent 180, cause the agent 180 to perform (some or all of) the operations of the example technique 320. The machine readable instructions may be stored on a non-transitory storage medium, which may include volatile media such as random-access-memory (RAM) (e.g., DRAM, SRAM, etc.) and/or persistent (non-volatile) media such as non-volatile memory (e.g., PROM, EPROM, EEPROM, NVRAM, etc.), flash drives, hard disk drives, optical disks, etc.

Referring to FIG. 3C and the technique 332 in conjunction with FIG. 1, in block 334, the managing node 110-1 of the local replication partner 108 may, in response to receiving replication partnership details from the agent 180, initiate (block 334) the SSH connection using the public IP address of the proxy server 152 and authenticate itself with the proxy server 152, pursuant to block 336. In accordance with block 338, after the SSH connection is set up, the managing storage node 110-1 may then configure the remote port forwarding to the storage node(s) 121 of the remote replication partner 120.

The technique 332 described above may be embodied (in whole or in part) in machine readable instructions that, when executed by a processor of the managing node 121-1, cause the managing node 121-1 to perform (some or all of) the operations of the example technique 330. The machine readable instructions may be stored on a non-transitory storage medium, which may include volatile media such as random-access-memory (RAM) (e.g., DRAM, SRAM, etc.) and/or persistent (non-volatile) media such as non-volatile memory (e.g., PROM, EPROM, EEPROM, NVRAM, etc.), flash drives, hard disk drives, optical disks, etc.

Figure 4:
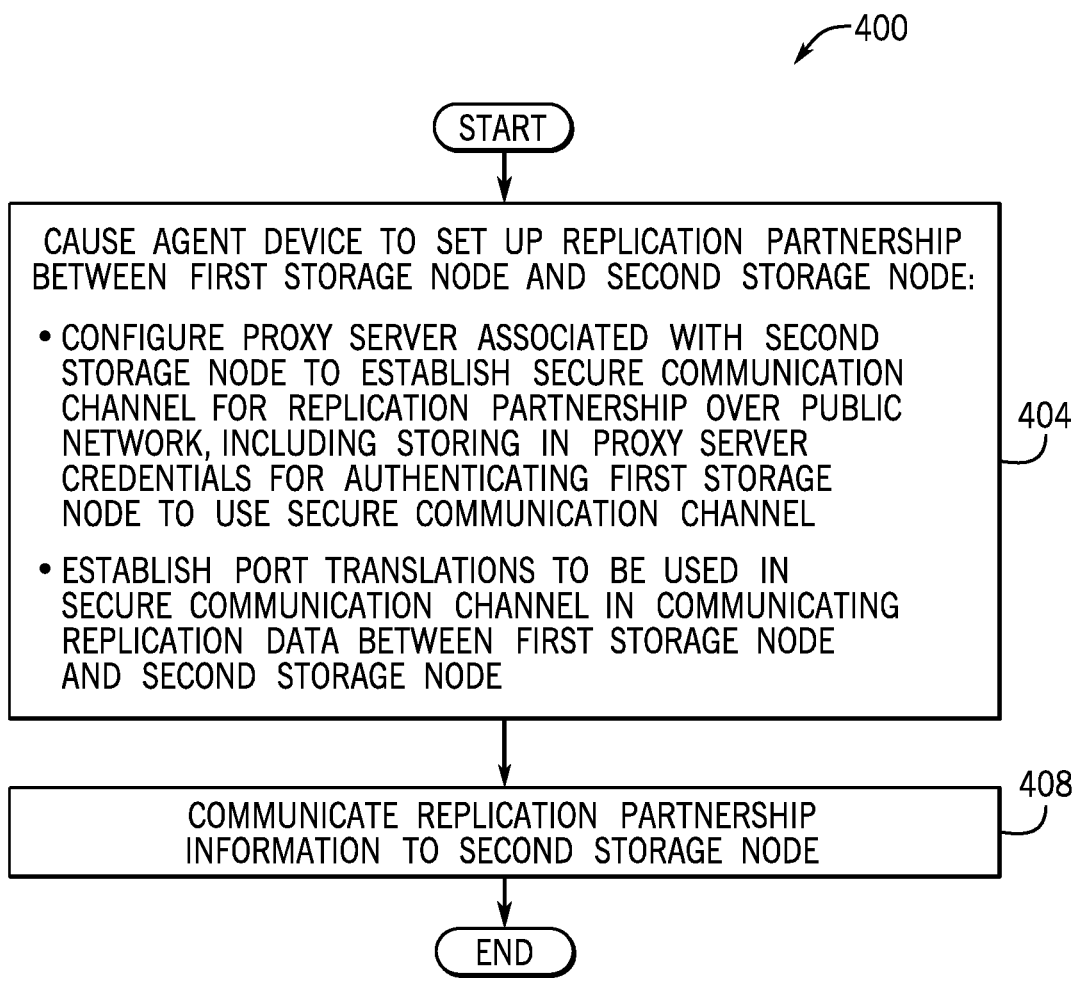
FIG. 4 is a flow diagram depicting a technique to setup a proxy server for a replication partnership in which replication data is communicated over a public network according to an example implementation.

Referring to FIG. 4 thus, in accordance with example implementations, a technique 400 may include causing (block 404) an agent device to set up a replication partnership between a first storage node and a second storage. Causing the agent device to setup the replication partnership may include configuring a proxy server that is associated with the second storage node to establish a secure communication channel for the replication partnership over a public network. Configuring the proxy server may include storing in the proxy server credentials for authenticating the first storage node to use the secure communication channel; and establishing port translations to be used in the secure communication channel in communicating replication data between the first storage node and the second storage node.

The technique 400 may include communicating replication partnership information to the second node, pursuant to block 408.

Figure 5:
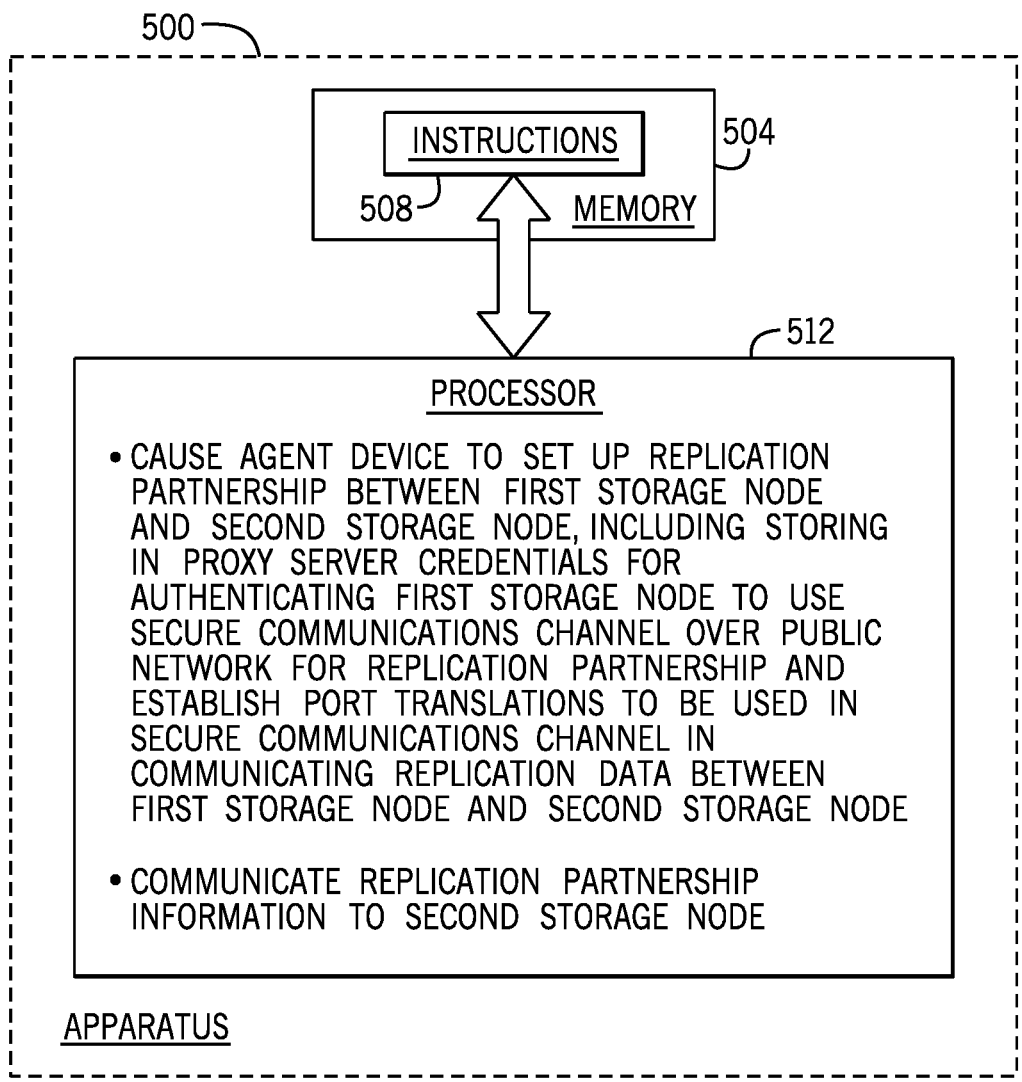
FIG. 5 is a schematic diagram of an apparatus that provides a proxy for a storage array of a replication partnership according to an example implementation.

Referring to FIG. 5, in accordance with example implementations, an apparatus 500 includes at least one processor 512 and a memory 504. The memory 504 stores instructions 508 that, when executed by the processor(s) 512, cause the processor(s) 512 to set up a replication partnership between a first storage node and a second storage node. More specifically, in accordance with example implementations, the instructions 508, when executed by the processor(s) 512, cause the processor(s) 512 to store in a proxy server credentials for authenticating the first storage node to use a secure communication channel over a public network for the replication partnership; and establish port translations to be used in the secure communication channel to communicate replication data between the first storage node and the second storage node. The instructions 508, when executed by the processor(s) 512, cause the processor(s) 512 to communicate replication partnership information to the second storage node.

The memory 504 may include any non-transitory storage medium, which may include volatile media, such as random-access-memory (RAM) (e.g., DRAM, SRAM, etc.) and/or persistent (non-volatile) media such as non-volatile memory (e.g., PROM, EPROM, EEPROM, NVRAM, etc.), flash drives, hard disk drives, optical disks, etc.

Figure 6:
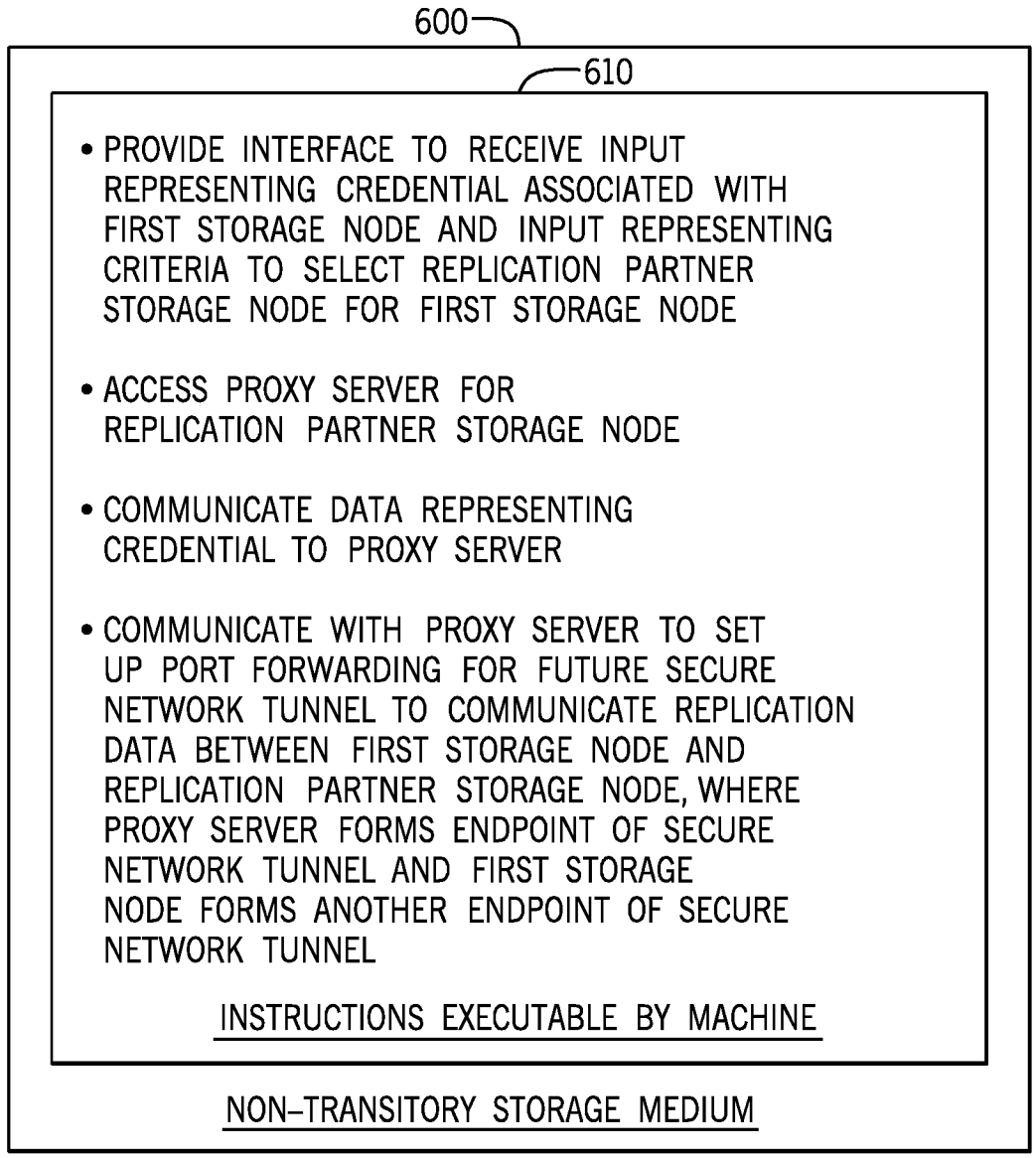
FIG. 6 is an illustration of instructions stored on a non-transitory storage medium, which are executable by a machine to setup a secure network tunnel to communicate replication data between storage nodes according to an example implementation.

Referring to FIG. 6, in accordance with example implementations, a non-transitory storage medium 600 stores machine executable instructions 610. In some examples, the instructions 610 may, when executed by a machine (a processor-based machine, for example), form an agent, such as the agent 180, that is to orchestrate establishment of a replication partnership between a local replication partner and a remote replication partner. For example, the instructions 610 may be such that, when they are executed by a machine, they cause the machine to provide an interface to receive input representing a credential associated with a first storage node and input representing criteria to select a replication partner storage node for the first storage node; access a proxy server for the replication partner storage node; communicate data representing the credential to the proxy server; and communicate with the proxy server to set up port forwarding for a future secure network tunnel to communicate replication data between the first storage node and the replication partner storage node, where the proxy server forms an endpoint of the secure network tunnel. The first storage node forms another endpoint of the secure network tunnel.

While the present disclosure has been described with respect to a limited number of implementations, those skilled in the art, having the benefit of this disclosure, will appreciate numerous modifications and variations therefrom. It is intended that the appended claims cover all such modifications and variations. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A method comprising:
    causing an agent device, other than a first storage node and other than a second storage node, to set up a replication partnership between the first storage node and the second storage node, wherein causing the agent device to set up the replication partnership comprises:
        providing a portal associated with the agent device and accessible through a public network to receive data to request the replication partnership, identify the first storage node, identify a criterion for selecting the second storage node and provide a cryptographic credential associated with the first storage node, wherein the cryptographic credential corresponds to a secure communication channel and is to be used by a proxy server to authenticate the first storage node in response to the first storage node initiating the secure communication channel with the proxy server in association with the replication partnership;
        causing the agent device to communicate over the public network with the proxy server to configure the proxy server to establish the secure communication channel for the replication partnership over the public network, wherein the proxy server is associated with the second storage node, the proxy server is separate from the second storage node, and configuring the proxy server comprises:
            causing the agent device to communicate data to the proxy server representing a replication partnership identification associated with the first storage node and a replication partnership credential associated with the first storage node;
            storing the cryptographic credential in the proxy server; and
            the agent device requesting port translations to be used by the proxy server in the secure communication channel in communicating replication data between the first storage node and the second storage node; and
        communicating replication partnership information to the second storage node.

2. The method of claim 1, wherein the proxy server and the second storage node comprise part of a private network;
    the private network comprises a plurality of storage nodes, including the second storage node; and
    configuring the proxy server further comprises selecting the second storage node from among the plurality of storage nodes.

3. The method of claim 1, wherein the agent device requesting the port translations comprises the agent device requesting local tunnel and reverse tunnel port translations associated with a public Internet Protocol (IP) address of the proxy server.

4. The method of claim 1, wherein configuring the proxy server comprises configuring the proxy server to communicate with a tunnel endpoint associated with the first storage node.

5. The method of claim 1, wherein the criterion comprises a geographic region for a replication partner for the first storage node, the method further comprising:
    selecting the second storage node based on an identified geographic region; and
    causing the agent device to communicate an identifier to the proxy server, wherein the identifier identifies the second storage node.

6. The method of claim 5, further comprising:
    further basing selection of the second storage node on input identifying a storage tier associated with the replication partnership.

7. The method of claim 1, wherein configuring the proxy server further comprises causing the agent device to configure the proxy server to select one of the first storage node and the second storage node to be a replication source or a replication target.

8. The method of claim 1, wherein configuring the proxy server further comprises:
causing the agent device to communicate a Secure SHell (SSH) key associated with the first storage node to the proxy server.

9. The method of claim 1, wherein configuring the proxy server further comprises causing the agent device to communicate data representing an identification of the first storage node.

10. An apparatus comprising:
at least one processor; and
a memory that stores instructions that, when executed by the at least one processor, cause the at least one processor to setup a replication partnership between a first storage node and a second storage node, wherein the at least one processor is associated with an agent other than the first storage node and other than the second storage node, and setting up the replication partnership comprises the at least one processor executing instructions to:
provide a portal associated with the agent and accessible through a public network to receive data to request the replication partnership, identify the first storage node, identify a criterion for selecting the second storage node and provide a cryptographic credential associated with the first storage node, wherein the cryptographic credential corresponds to a secure communication channel and is to be used by a proxy server to authenticate the first storage node in response to the first storage node initiating the secure communication channel with the proxy server in association with the replication partnership;
communicate data to the proxy server representing a replication partnership identification associated with the first storage node and a replication partnership credential associated with the first storage node;
communicate with the proxy server using the public network to store the cryptographic credential in the proxy server, wherein the proxy server is associated with the second storage node and the proxy server is separate from the second storage node;
communicate with the proxy server using the public network to establish port translations to be used in the secure communication channel to communicate replication data between the first storage node and the second storage node; and
communicate replication partnership information with the second storage node using the public network.

11. The apparatus of claim 10, wherein the instructions, when executed by the at least one processor, cause the at least one processor to:
use the portal to receive data representing a credential of the first storage node.

12. The apparatus of claim 11, wherein the criterion for selecting the second storage node identifies a geographic region for a replication partner for the first storage node and the instructions, when executed by the at least one processor, cause the at least one processor to:
select the second storage node based on the identified geographic region; and
communicate an identifier to the proxy server, wherein the identifier identifies the second storage node.

13. The apparatus of claim 10, wherein the instructions, when executed by the at least one processor, cause the at least one processor to configure the proxy server to set up a network tunnel.

14. The apparatus of claim 13, wherein the network tunnel comprises a Secure SHell (SSH) tunnel, the cryptographic credential comprises an SSH key, and the proxy server comprises an SSH proxy server.

15. A non-transitory storage medium storing instructions that, when executed by a machine, cause the machine to:
provide, via a public network, access to an agent device, other than a first storage node and other than a second storage node, to setup a replication partnership between the first storage node and the second storage node;
provide a portal associated with the agent device and accessible through the public network to receive data to request the replication partnership, identify the first storage node, identify a criterion for selecting the second storage node and provide a cryptographic credential associated with the first storage node, wherein the cryptographic credential corresponds to a secure communication channel and is to be used by a proxy server to authenticate the first storage node in response to the first storage node initiating the secure communication channel with the proxy server in association with the replication partnership;
cause the agent device to communicate over the public network to access the proxy server;
cause the agent device to communicate data to the proxy server representing a replication partnership identification associated with the first storage node and a replication partnership credential associated with the first storage node,
cause the agent device to communicate over the public network data representing the cryptographic credential to the proxy server; and
communicate with the proxy server over the public network to set up port forwarding for a secure network tunnel to communicate replication data between the first storage node and the second storage node, wherein the proxy server forms an endpoint of the secure network tunnel and the first storage node forms another endpoint of the secure network tunnel.

16. The non-transitory storage medium of claim 15, wherein the instructions, when executed by the machine, further cause the machine to communicate with the proxy server to reserve a public network port of the proxy server and map the public network port to a private network port of the second storage node.

17. The non-transitory storage medium of claim 15, wherein the criterion identifies a geographic region and the instructions, when executed by the machine, further cause the machine to select the second storage node based on the geographic region.

18. The non-transitory storage medium of claim 15, wherein the cryptographic credential comprises a Secure SHell (SSH) key, and the proxy server comprises an SSH proxy server.

* * * * *